(12) United States Patent
Lee et al.

(10) Patent No.: US 11,184,678 B2
(45) Date of Patent: Nov. 23, 2021

(54) DISPLAY APPARATUS AND METHOD FOR RECOMMENDING CONTENTS OF THE DISPLAY APPARATUS

(71) Applicant: SAMSUNG ELECTRONICS CO., LTD., Suwon-si (KR)

(72) Inventors: Sang-hee Lee, Yongin-si (KR); Sung-ho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 767 days.

(21) Appl. No.: 14/499,787

(22) Filed: Sep. 29, 2014

(65) Prior Publication Data
US 2015/0181304 A1 Jun. 25, 2015

(30) Foreign Application Priority Data

Dec. 19, 2013 (KR) ........................ 10-2013-0158958

(51) Int. Cl.
| | | |
|---|---|---|
| *H04N 21/482* | (2011.01) | |
| *H04N 21/431* | (2011.01) | |
| *H04N 21/466* | (2011.01) | |
| *H04N 21/442* | (2011.01) | |

(52) U.S. Cl.
CPC ..... *H04N 21/4826* (2013.01); *H04N 21/4312* (2013.01); *H04N 21/44204* (2013.01); *H04N 21/44222* (2013.01); *H04N 21/4668* (2013.01)

(58) Field of Classification Search
USPC ....................................................... 707/732
See application file for complete search history.

(56) References Cited

U.S. PATENT DOCUMENTS

| | | | |
|---|---|---|---|
| 9,032,463 B2 | 5/2015 | Kim et al. | |
| 2002/0199193 A1* | 12/2002 | Gogoi et al. | H04N 5/44543 |
| | | | 725/46 |
| 2005/0071783 A1* | 3/2005 | Atkins | G06F 17/509 |
| | | | 715/851 |
| 2007/0002377 A1* | 1/2007 | Tokunaga | G06F 17/211 |
| | | | 358/1.18 |
| 2008/0209325 A1 | 8/2008 | Suito et al. | |
| 2009/0271837 A1 | 10/2009 | Kim et al. | |

(Continued)

FOREIGN PATENT DOCUMENTS

| | | |
|---|---|---|
| EP | 2 063 633 A1 | 5/2009 |
| JP | 2011-517224 | 5/2011 |

(Continued)

OTHER PUBLICATIONS

Extended European Search Report dated May 19, 2015 in corresponding European Patent Application No. 14175094.3.

(Continued)

*Primary Examiner* — Muluemebet Gurmu
(74) *Attorney, Agent, or Firm* — Staas & Halsey, LLP

(57) ABSTRACT

A display apparatus is provided. The display apparatus includes a storage configured to store log information on content viewing, a display, and a controller configured to display a content recommendation screen on the display. The content recommendation screen includes an object of a recommendation content corresponding to the log information and is generated by using a layout suitable for the object.

17 Claims, 11 Drawing Sheets

(56) References Cited

U.S. PATENT DOCUMENTS

| | | | | |
|---|---|---|---|---|
| 2010/0262986 | A1* | 10/2010 | Adimatyam | H04N 21/47 725/9 |
| 2011/0131161 | A1* | 6/2011 | Aravamudan | G06F 17/30035 706/12 |
| 2011/0302165 | A1* | 12/2011 | Ishii | G06Q 30/0282 707/737 |
| 2013/0155117 | A1 | 6/2013 | Bang | |
| 2013/0185648 | A1 | 7/2013 | Kim | |
| 2013/0204825 | A1* | 8/2013 | Su | G06N 5/04 706/46 |
| 2013/0268888 | A1 | 10/2013 | Oshiro et al. | |
| 2014/0075477 | A1* | 3/2014 | de Paz et al. | G06F 3/017 725/37 |
| 2019/0238947 | A1* | 8/2019 | Pontual | H04N 21/4826 |

FOREIGN PATENT DOCUMENTS

| | | |
|---|---|---|
| KR | 10-2003-0003276 | 1/2003 |
| KR | 10-0374391 | 3/2003 |
| KR | 10-2007-0115603 | 12/2007 |
| KR | 10-0839306 | 6/2008 |
| KR | 10-2009-0031927 | 3/2009 |
| KR | 10-2009-0063232 | 6/2009 |
| KR | 10-0941272 | 2/2010 |
| KR | 20-0458255 | 2/2012 |
| KR | 10-1145877 | 5/2012 |
| KR | 10-2012-0076682 | 7/2012 |
| KR | 10-2013-0063804 | 6/2013 |
| KR | 10-2013-0069039 | 6/2013 |
| KR | 10-2013-0084543 | 7/2013 |
| WO | 02/073298 | 9/2002 |
| WO | 2008/002140 | 1/2008 |
| WO | 2008/027538 | 3/2008 |

OTHER PUBLICATIONS

European Office Action dated Nov. 22, 2017 in corresponding European Patent Application No. 14 175 094.3.
Korean Office Action dated Dec. 8, 2017 in corresponding Korean Patent Application No. 10-2013-0158958.
European Office Action dated Sep. 19, 2018 in European Patent Application No. 14175094.3.
European Summons to Attend Oral Proceedings dated Mar. 26, 2018, in corresponding European Patent Application No. 14175094. 3, 9 pgs.
Extended European Search Report dated Mar. 13, 2019 in European Patent Application No. 18209133.0.
European Examination Report dated May 12, 2021 in Application No. 18 209 133.0-1209.

* cited by examiner

DISPLAY APPARATUS AND METHOD FOR RECOMMENDING CONTENTS OF THE DISPLAY APPARATUS

CROSS-REFERENCE TO RELATED APPLICATIONS

This application claims the benefit under 35 U.S.C. § 119(a) of a Korean patent application filed on Dec. 19, 2013 in the Korean Intellectual Property Office and assigned Serial No. 10-2013-0158958, the entire disclosure of which is hereby incorporated by reference.

BACKGROUND

1. Field

Apparatuses and methods consistent with exemplary embodiments relate to a display apparatus and a method for recommending contents of the display apparatus, and more particularly, to a display apparatus which generates a content recommendation screen using various layouts, and a method for recommending contents of the display apparatus.

2. Description of the Related Art

As electronic technologies have developed, technology for providing lots of content using a variety of display apparatuses is being developed. In particular, display apparatuses for providing various content based on communication with users like an Internet Protocol Television (IPTV) or a Digital TV (DTV) are in the spotlight in recent years.

However, since lots of content is unilaterally provided to the users through such display apparatuses, the user often needs to spend great time and effoto select a desired content. In order to overcome such inconvenience, a service of recommending contents to the user has come into existence and such a service is provided through a content recommendation User Interface (UI) screen.

However, the layout of the conventional content recommendation screen is fixed to a certain standard type and thus cannot reflect the varying characteristics of objects to be displayed on the screen. For example, most movie poster images are in a portrait format, and most TV show images are in landscape format. However, conventionally displaying such images may result in the images being abnormally shrunk or expanded on the fixed layout or may result in segmenting of the images or incomplete images in severe cases. In addition, most of the images cannot be arbitrarily edited due to copyright laws. Conventional display apparatuses have not proposed any special solution to this problem.

Therefore, there is a demand for a display apparatus that can provide an optimal design in a screen configuration without altering an object image of a content recommendation screen.

SUMMARY

One or more exemplary embodiments may overcome the above disadvantages while additionally overcoming other disadvantages not expressly described above. However, it is understood that one or more exemplary embodiments are not required to overcome the disadvantages described above, and may not overcome any of the problems described above, while instead overcoming other disadvantages.

One or more exemplary embodiments provide a display apparatus which can generate a content recommendation screen using a variety of layouts, and a method for recommending contents of the display apparatus.

According to an aspect of an exemplary embodiment, there is provided a display apparatus including: a storage configured to store log information on content viewing; a display; and a controller configured to display a content recommendation screen on the display, the content recommendation screen including an object of a recommendation content corresponding to the log information and being generated by using a layout suitable for the object.

The storage may store a plurality of pieces of layout information which are differently set, and the controller may select layout information corresponding to the object of the recommendation content from among the plurality of pieces of layout information, and may generate the content recommendation screen based on the selected layout information.

The content recommendation screen may be divided into one or more areas according to the layout, and the object of the recommendation content may be displayed on the area according to an attribute assigned to the area.

The attribute may include at least one of a size, an aspect ratio, a color, a resolution, brightness, a language, and a kind of object of the object of the recommendation content.

The storage may store a plurality of pieces of layout information which are differently set, and the controller may calculate a ratio value of a number of times a first type of content has been viewed and a number of times a second type of content has been viewed based on the log information, may select layout information corresponding to the calculated ratio value from among the plurality of pieces of layout information stored in the storage, and may control the display to rearrange the object of the recommendation content according to the selected layout information and display the object on the content recommendation screen.

When a proportion of the viewed first type of content is greater than or equal to a predetermined value, the controller may select layout information consisting of only an object display area for displaying the first type of content, and, when a proportion of the viewed second type of content is greater than or equal to a predetermined value, the controller may select layout information consisting of only an object display area for displaying the second type of content.

The display apparatus may further include a communicator configured to receive information on an essential recommendation content, and the controller may control the display to display an object corresponding to the essential recommendation content on the content recommendation screen.

When a layout changing command is input, the controller may change a layout of the content recommendation screen according to the layout changing command, and may control the display to rearrange the object of the recommendation content on the content recommendation screen according to the changed layout and display the content recommendation screen.

When a new recommendation command is input, the controller may control the display to rearrange a new object which is different from the exiting object displayed on the content recommendation screen on the content recommendation screen according to the layout, and display the content recommendation screen.

According to an aspect of another exemplary embodiment, there is provided a method for recommending contents of a display apparatus, the method including: storing log information on content viewing; and generating a content recommendation screen including an object of a recommendation content corresponding to the log information according to a layout suitable for the object, and displaying the content recommendation screen.

The displaying may include: selecting layout information corresponding to the object of the recommendation content from among a plurality of pieces of layout information which are pre-stored and differently set; and generating the content recommendation screen based on the selected layout information and displaying the content recommendation screen.

The content recommendation screen may be divided into a plurality of areas according to the layout, and the displaying may include displaying the object of the recommendation content on each area according to an attribute assigned to each of the plurality of areas.

The attribute may include at least one of a size, an aspect ratio, a color, a resolution, brightness, a language, and a kind of object of the object of the recommendation content.

The displaying may include: calculating a ratio value of a number of times a first type of content has been viewed and a number of times a second type of content has been viewed based on the log information, and selecting layout information corresponding to the calculated ratio value from among the pre-stored plurality of pieces of layout information; and rearranging the object of the recommendation content according to the selected layout information and displaying the object on the content recommendation screen.

The selecting may include: when a proportion of the viewed first type of content is greater than or equal to a predetermined value, selecting layout information consisting of only an object display area for displaying the first type of content; and, when a proportion of the viewed second type of content is greater than or equal to a predetermined value, selecting layout information consisting of only an object display area for displaying the second type of content.

The method may further include receiving information on an essential recommendation content, and the displaying may include displaying an object corresponding to the essential recommendation content on the content recommendation screen.

The method may further include: receiving a layout changing command; and changing a layout of the content recommendation screen according to the layout changing command, and rearranging the object of the recommendation content on the content recommendation screen according to the changed layout and displaying the content recommendation screen.

The method may further include: receiving a new recommendation command; and rearranging a new object which is different from the exiting object displayed on the content recommendation screen on the content recommendation screen according to the layout, and displaying the content recommendation screen.

According to an aspect of another exemplary embodiment a display is provided. The display includes a storage to store log information comprising tracked viewing habits and a controller including a hardware-based processor to analyze the log information to select layout information from among a plurality of pieces of layout information and to control the display to display content using the selected layout information.

According to an aspect of another exemplary embodiment a display is provided. The display includes a storage to store log information comprising tracked viewing habits and a controller including a hardware-based processor to generate a content recommendation screen including an object of recommendation content obtained based on the log information stored in the storage, to select layout information from among a plurality of pieces of layout information according to the object, and to display the content recommendation screen including the object on the display using the selected layout information.

According to an aspect of another exemplary embodiment a method of displaying information on a display is provided. The method includes collecting log information comprising tracked viewing habits of a user, the log information comprising a number of times a first type of content has been viewed, a number of times a second type of content has been viewed, and a number of times all content has been viewed, determining a ratio comprising the number of times the first type of content has been viewed and the number of times all content has been viewed and selecting a first display layout comprising a plurality of first objects representing the first type of content when the determined ratio is greater than a first threshold and otherwise selecting a second display layout comprising both the plurality of first objects representing the first type of content and a plurality of second objects representing the second type of content.

In an embodiment, the first display layout includes only the plurality of first objects representing the first type of content without including any of the plurality of second objects representing the second type of content.

According to the various exemplary embodiments as described above, the content recommendation screen is generated by using various layouts reflecting the user's viewing pattern to improve user convenience.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
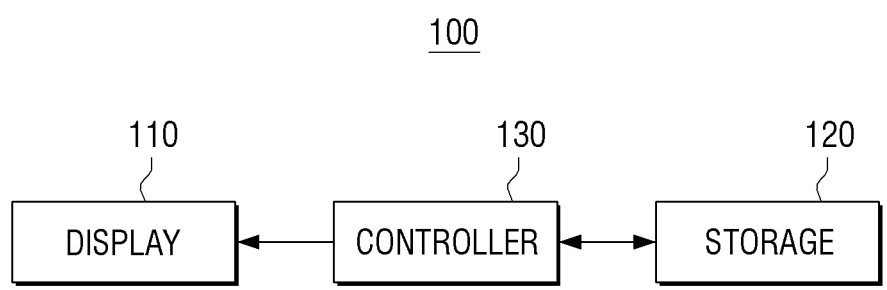
FIG. 1 is a block diagram illustrating a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a display apparatus according to an exemplary embodiment. Referring to FIG. 1, the display apparatus 100 may include a display 110, a storage 120, and a controller 130. The display apparatus 100 according to an exemplary embodiment may be a TV. However, this is merely an example and the display apparatus 100 may be implemented by using a variety of display apparatuses such as a smart phone, a tablet PC, a desktop PC, a monitor, a projector, etc.

The display 110 is an element for displaying a screen including at least one object. In an embodiment, the term "screen" refers to an image frame that is provided with the display 110 in the display apparatus 100. Specifically, the screen may include a broadcast program screen, a home screen, an icon screen, a list screen, an application execution screen, a web browser screen, or a content playback screen, etc. In addition, in an embodiment the term "object" refers to an icon, a photo, a content, an image, a text, a widget area, etc., which are displayable on the screen. The display 110 displays video data under the control of the controller 130.

In particular, the display 110 may be controlled by the controller 130 to output a content recommendation screen. In an embodiment, the content recommendation screen refers to a screen including a variety of information such as a name of a content that the display apparatus 100 wishes to recommend to the user, a preview image, an advertisement image, manufacturer information, a possible date for viewing, a purchasing location, etc. The content recommendation screen may display an object corresponding to recommended content, such as a text, an image, a moving image, an icon, etc. When the user selects an object, a recommendation content corresponding to the selected object may be executed. For example, when the recommendation content is a movie, the object of the recommendation content displayed on the content recommendation screen may be a poster image of a movie, i.e., a movie poster, provided by a film production company, and, when the recommendation content is a TV drama, the object may be an image provided by a drama production company.

The storage 120 is an element for storing various programs or data used in the display apparatus 100. In particular, the storage 120 may store log information on content viewing and the log information may be updated at regular intervals. The log information is information in which metadata regarding the content that the user has viewed is accumulated, and may be used to grasp user's preference for a content genre. In addition, the storage 120 may store a plurality of pieces of layout information which are set differently, and the content recommendation screen may be generated by using a layout corresponding to layout information that is selected from among the plurality of pieces of layout information.

The controller 130 is configured to control an overall operation of the display apparatus 100. The controller 130 may include one or more hardware-based processors.

Specifically, when the user tunes to a specific broadcast channel and views content such as a broadcast program received through the broadcast channel or when the user views a downloaded content by playing it, the controller 130 may generate new log information for each content and store the log information, or may update pre-stored log information. The log information may include a variety of information such as a name of a viewed content, a viewing time, a number of times the content has been viewed by the user, genre information, a user rating of the content, etc.

In addition, the controller 130 may generate the content recommendation screen including the object of the recommendation content corresponding to the log information on content viewing stored in the storage 120, by using a layout suitable for the object, and may display the content recommendation screen on the display 110. For example, if the log information indicates that the user prefers a particular genre of movie, the controller 130 may generate the content recommendation screen including a movie poster of another movie belonging to the preferred genre of the user indicated by the log information The recommendation content may be a content that is recommended by a content provider or may be a content that is determined as a recommendation content by the controller 130 of the display apparatus 100. The recommendation content may be determined based on user's content viewing log information, search log information on a content that the user has searched, ratings information, Video On Demand (VOD) popularity ratings information, a contract between the content provider and the user, etc.

In addition, the controller 130 may generate the content recommendation screen based on the layout information selected from the plurality of pieces of layout information stored in the storage 120. In this case, the layout may be selected, reflecting user's content preference. The controller 130 may determine the user's content preference based on the log information. Specifically, when the user has viewed a movie content more than a predetermined number of times, the controller 130 may determine the user to have movie mania, that is, to have a love of movies and, when the user has viewed a TV show more than a predetermined number of times, the controller 130 may determine the user to have a TV show mania that is, to have a love of TV shows.

When the user is determined to have movie mania, the controller 130 may select a layout configured for movie mania, that is, to appeal to a movie maniac. When the user is determined to have TV show mania, the controller 130 may select a layout configured for the TV show mania, that is, to appeal to a TV show maniac. When the layout for the movie maniac is selected, the controller 130 may generate a content recommendation screen including an object display area suitable for an aspect ratio of a movie poster image. When the layout for the TV show maniac is selected, the controller 130 may generate a content recommendation screen including an object display area having a shape, size, or aspect ratio suitable for a TV show screen. The content recommendation screens generated in various ways reflecting the user's preference as described above will be explained in detail with reference to FIGS. 3 to 6.

As described above, the display apparatus 100 can provide the user with various content recommendation screens generated by using the layout reflecting the user's determined content preference.

Although essential elements for explaining the exemplary embodiments are illustrated in FIG. 1, the display apparatus of FIG. 1 may be implemented by using various kinds of apparatuses as described above.

Figure 2:
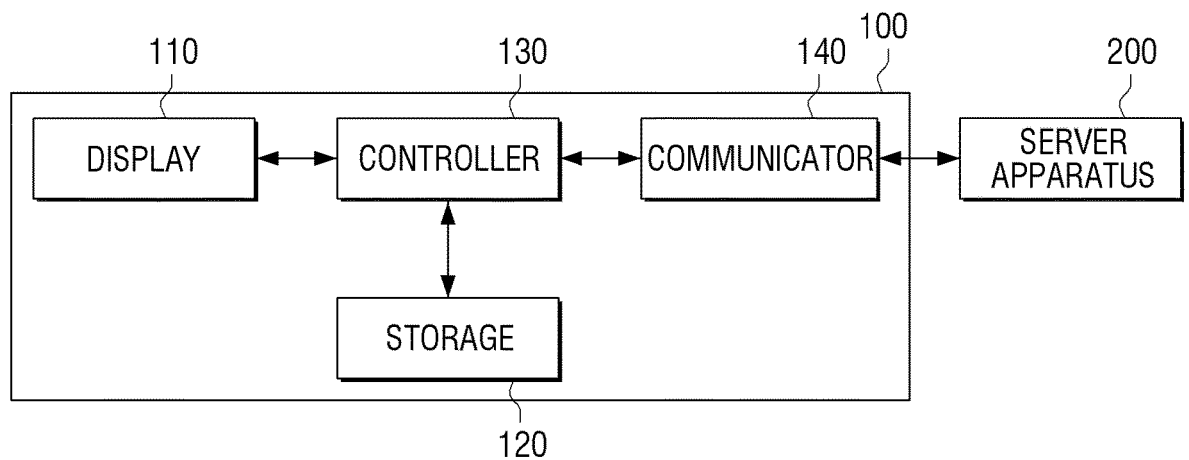
FIG. 2 is a block diagram illustrating a display apparatus which communicates with a server apparatus according to an exemplary embodiment.

FIG. 2 is a block diagram illustrating a display apparatus that communicates with a server apparatus according to another exemplary embodiment.

Referring to FIG. 2, the display apparatus 100 includes not only a display 110, a storage 120, and a controller 130, but also a communicator 140. The display apparatus 100 is connected with a server apparatus 200 through the communicator 140.

The server apparatus 200 may store a plurality of pieces of layout information, which are differently set. The plurality of pieces of layout information may be edited or added by the user to be updated.

The controller 130 may receive layout information corresponding to an object of a recommendation content from the server apparatus 200 through the communicator 140, and may generate a content recommendation screen based on the received layout information.

Specifically, the controller 130 generates object information of a recommendation content corresponding to log information on content viewing of the user, which is stored in the storage 120, and transmits the object information to the server apparatus 200 through the communicator 140. The server apparatus 200 selects layout information corresponding to the object of the recommendation content based on the transmitted information, and transmits the layout information to the display apparatus 100. For example, the server apparatus 200 may calculate a ratio value between the number of times a first type of content has been viewed and the number of times a second type of content has been viewed based on the log information, and may select the layout information corresponding to the calculated ratio value. When a proportion of the first type of content viewed is greater than or equal to a predetermined value, the server apparatus 200 may select layout information made up of only an object display area for displaying the first type of content, and, when a proportion of the second type of contents viewed is greater than or equal to a predetermined value, the server apparatus 200 may select layout information made up of only an object display area for displaying the second type of content.

The controller 130 receives the selected layout information from the server apparatus 200, generates a content recommendation screen, and displays the content recommendation screen on the display 110. Alternatively, when a command to change the layout of the content recommendation screen is input, the controller 130 receives new layout information from the server apparatus 200 according to the command, rearranges the object of the recommendation content according to the received layout, and displays the content recommendation screen on the display 110.

The content recommendation screen may be divided into at least one area according to the layout information, and is displayed through the display 110. A specific attribute may be assigned to each area of the content recommendation screen, and the object of the recommendation content is arranged according to the attribute. Since the object of the recommendation content is arranged in the same way as in FIG. 1, a redundant explanation is omitted.

According to another exemplary embodiment, the communicator 140 may receive information on an essential recommendation content. In an embodiment, the term "essential recommendation content" refers to content that is essential and that should be displayed on the content recommendation screen, and may be determined by a contract between the content provider and the user. When the essential recommendation content is received, the controller 130 may control the display 230 to display an object corresponding to the essential recommendation content on the content recommendation screen.

The method for generating the content recommendation screen in the display apparatus 100 according to various exemplary embodiments has been described. However, according to another exemplary embodiment, the content recommendation screen may be generated in the server apparatus 200 in the same way and may be transmitted to the display apparatus 100. This exemplary embodiment will be explained below with reference to FIG. 3.

Figure 3:
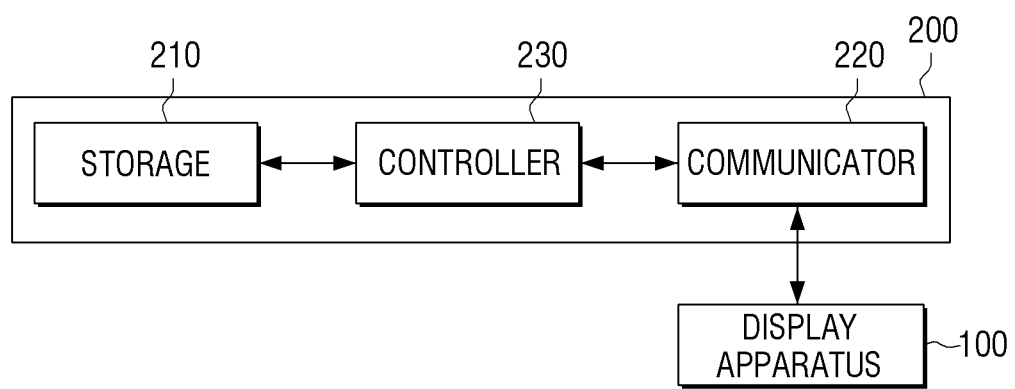
FIG. 3 is a block diagram illustrating a server apparatus according to an exemplary embodiment.

FIG. 3 is a block diagram illustrating a server apparatus that generates a content recommendation screen according to an exemplary embodiment.

Referring to FIG. 3, the server apparatus 200 may include, for example, a storage 210, a communicator 220, and a controller 230.

The storage 210 stores a plurality of pieces of layout information which are set differently. The plurality of pieces of layout information may be edited or added by the user to be updated. According to another exemplary embodiment, the storage 210 may store information on an essential recommendation content. The controller 230 may generate a content recommendation screen to mandatorily include an object corresponding to the essential recommendation content based on the information on the essential recommendation content.

The communicator 220 receives log information on content viewing of the user from the display apparatus 100. The server apparatus 200 may communicate with another external apparatus through the communicator 220 and may receive a variety of information such as the information on the essential recommendation content.

The controller 230 selects one piece of layout information from among the stored pieces of layout information based on the received log information. The method for selecting the layout information is the same as that in the above-described exemplary embodiments, and thus a redundant explanation is omitted. The controller 230 generates the content recommendation screen based on the selected layout information and transmits the content recommendation screen to the display apparatus 100 through the communicator 220. The content recommendation screen may be received through the communicator of the display apparatus 100.

The server apparatus 200 may be connected with one or more display apparatuses in a wired or wireless communication method. In this case, the log information received from the one or more display apparatuses may reflect a variety of user's preference, and the controller 230 may select the layout information based on the log information.

According to the various exemplary embodiments as described above, the content recommendation screen may be divided into a plurality of areas according to the layout, and the object of the recommendation content is displayed on each area according to the attributes assigned to each of the plurality of areas. Each of the plurality of areas may be assigned the attribute regarding an object size of the recommendation content, an aspect ratio, a color, a resolution, brightness, a language, a kind of object, etc.

For example, when the content recommendation screen is divided into a first area and a second area, the first area may be assigned a portrait image attribute like a movie poster having a portrait aspect ratio, and the second area may be assigned a landscape image attribute like a general TV show representative image having a landscape aspect ratio. In this case, a portrait movie poster image object may be displayed in the first area, and a landscape TV show representative image object may be displayed in the second area.

According to various exemplary embodiments, the content recommendation screen may consist of only the areas assigned the same attribute or may consist of a mixture of the areas assigned different attributes. Representative examples of the layouts for the various content recommendation screens described above are illustrated in FIGS. 4 to 7.

Figure 4:
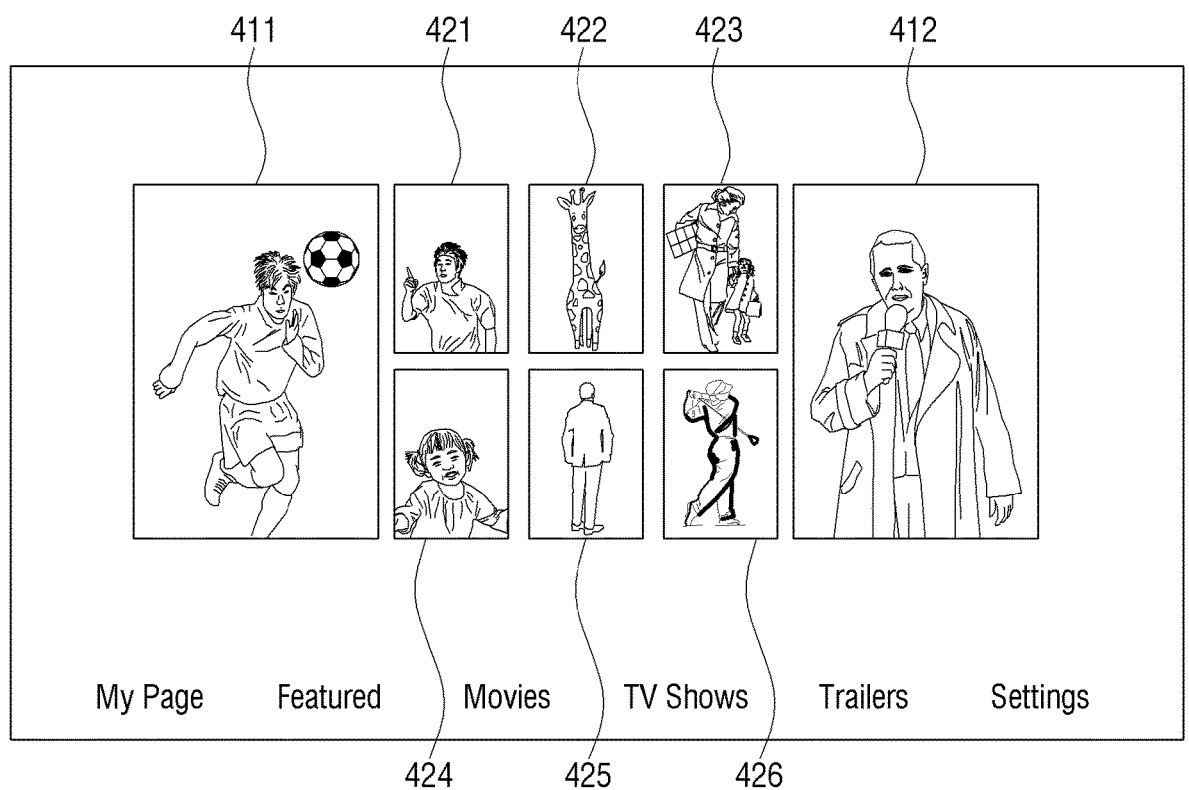
FIGS. 4 to 7 are views illustrating content recommendation screens according to various exemplary embodiments.

FIG. 4 is a view illustrating a content recommendation screen according to an exemplary embodiment. The content recommendation screen illustrated in FIG. 4 is generated by using a layout that is suitable for arranging a portrait image object, for example, a movie poster image object having a portrait aspect ratio. That is, referring to FIG. 4, the content recommendation screen may be configured by the layout that is designed to display areas 421 to 426 for displaying small images between areas 411 and 412 for displaying relatively large two images. Six small images may be arranged in the small image display areas 421 to 426 in the form of a matrix according to the attribute of the small image display areas, and two large images may be displayed in the large image display areas 411 and 412 according to the attribute of the large image display areas. Each of the objects is a portrait image object having a portrait aspect ratio with the height longer than the width.

For example, when the user has frequently viewed movies with the display apparatus 100, the controller 130 may generate the content recommendation screen by using a "movie mania layout" based on analysis of log information on user content viewing, as shown in FIG. 4. The controller 130 selects movie contents from among the contents as recommendation contents, and display the content recommendation screen on which an advertisement movie poster of each recommendation content or other recommendation objects are arranged according to the movie mania layout.

Figure 5:
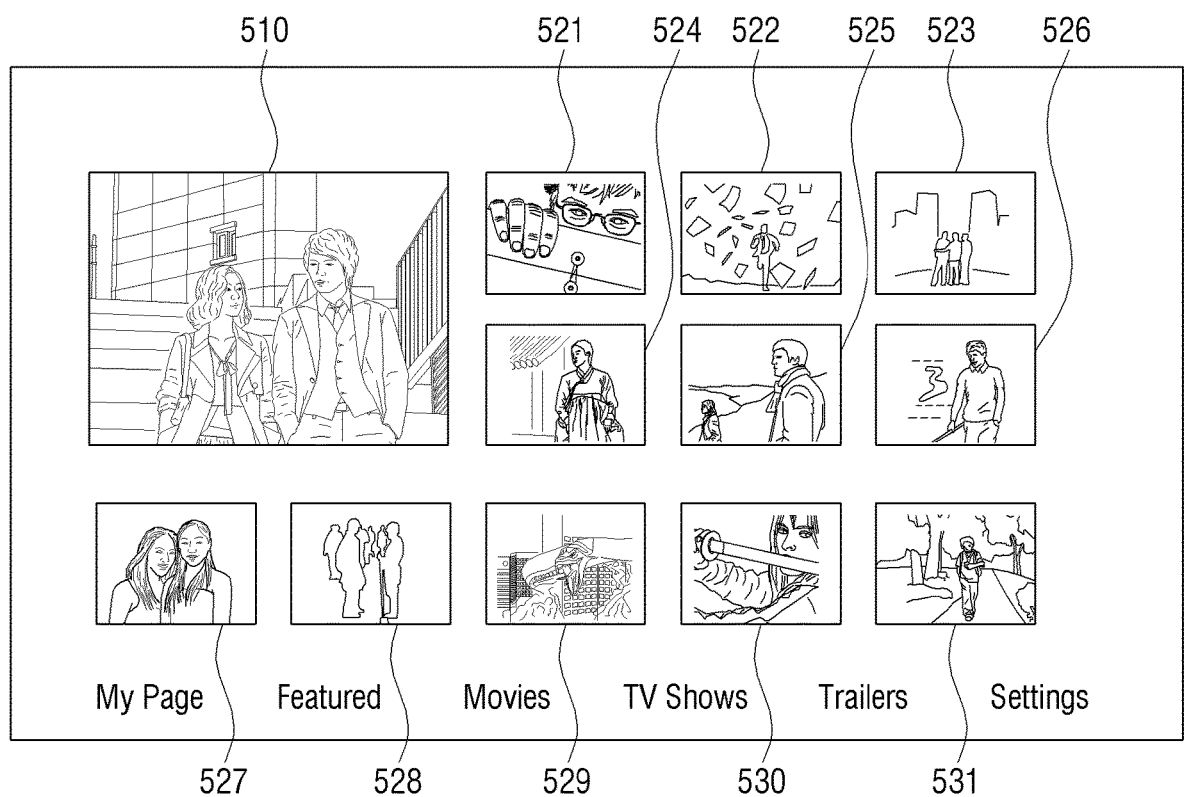

FIG. 5 is a view illustrating a content recommendation screen according to another exemplary embodiment. The content recommendation screen illustrated in FIG. 5 is generated by using a layout that is suitable for arranging a TV show image object. Referring to FIG. 5, the layout for the TV shows consists of areas for displaying landscape images which have a landscape aspect ratio with the width longer than the height. From among those areas, the upper left corner area 510 has an attribute to display a relatively large image. The other areas 521 to 531 have an attribute to display a relatively small image.

For example, when the user has frequently viewed TV shows through the display apparatus 100, the controller 130 may generate the content recommendation screen by using a "TV show mania layout" based on analysis of log information on content viewing as shown in FIG. 5. Accordingly, from among the recommendation contents, only TV shows are provided to the user through the content recommendation screen.

Figure 6:
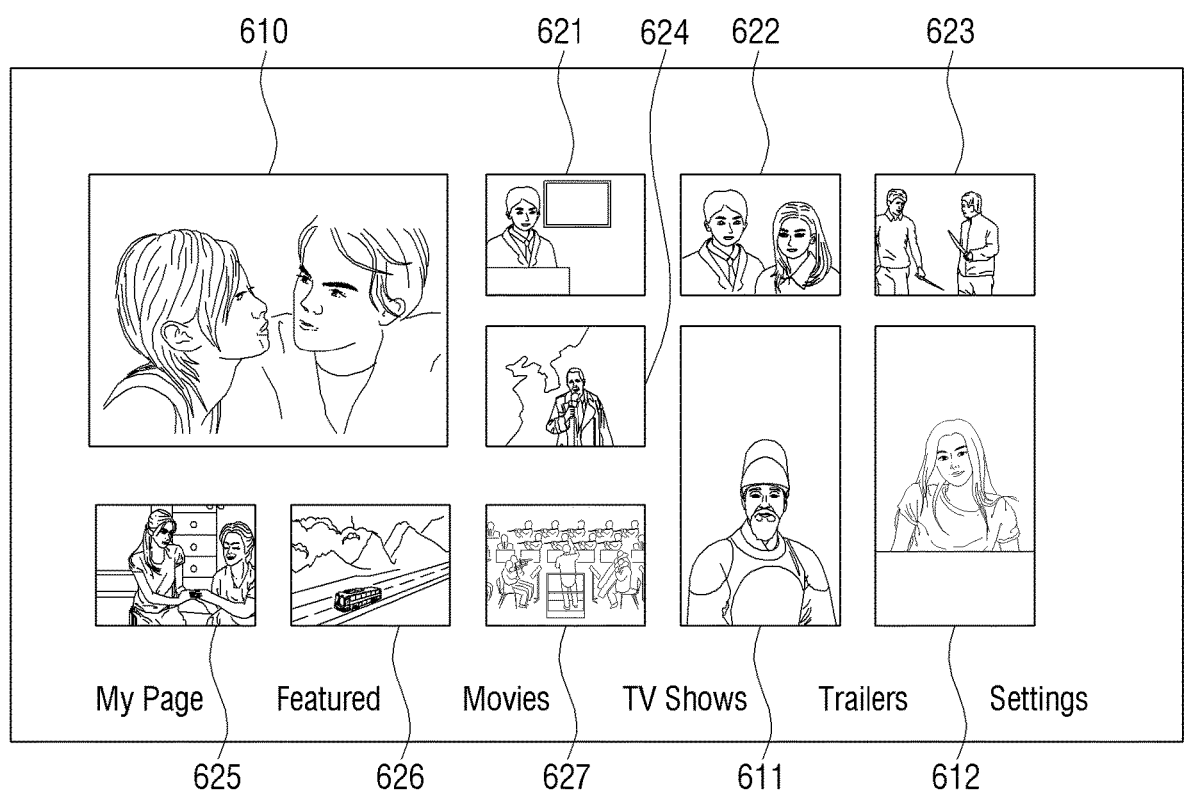

FIG. 6 is a view illustrating a content recommendation screen according to another exemplary embodiment. The content recommendation screen illustrated in FIG. 6 is generated by using a layout that is suitable for arranging a mixture of both landscape image objects and portrait image objects. This screen is a layout for mainly displaying the landscape image objects. Referring to FIG. 6, the screen consists of areas for displaying the landscape images and the portrait images. From among those areas, the upper left corner area 610 has an attribute to display a relatively large image. The other areas may have an attribute to display relatively small images and may consist of areas 611 and 612 for displaying portrait images and areas 621 to 627 for displaying landscape images. In an embodiment, the screen may be configured as a first area that only displays one or more portrait image objects having a portrait aspect ratio and as a second area that only displays one or more landscape image objects having a landscape aspect ratio.

For example, when the user has viewed TV shows more than movies with the display apparatus 100, the controller 130 may generate the content recommendation screen by using a "TV show preference layout" based on analysis of log information on content viewing, as shown in FIG. 6. Accordingly, the proportion of the TV shows provided to the user through the content recommendation screens is higher than that of the movies.

Figure 7:
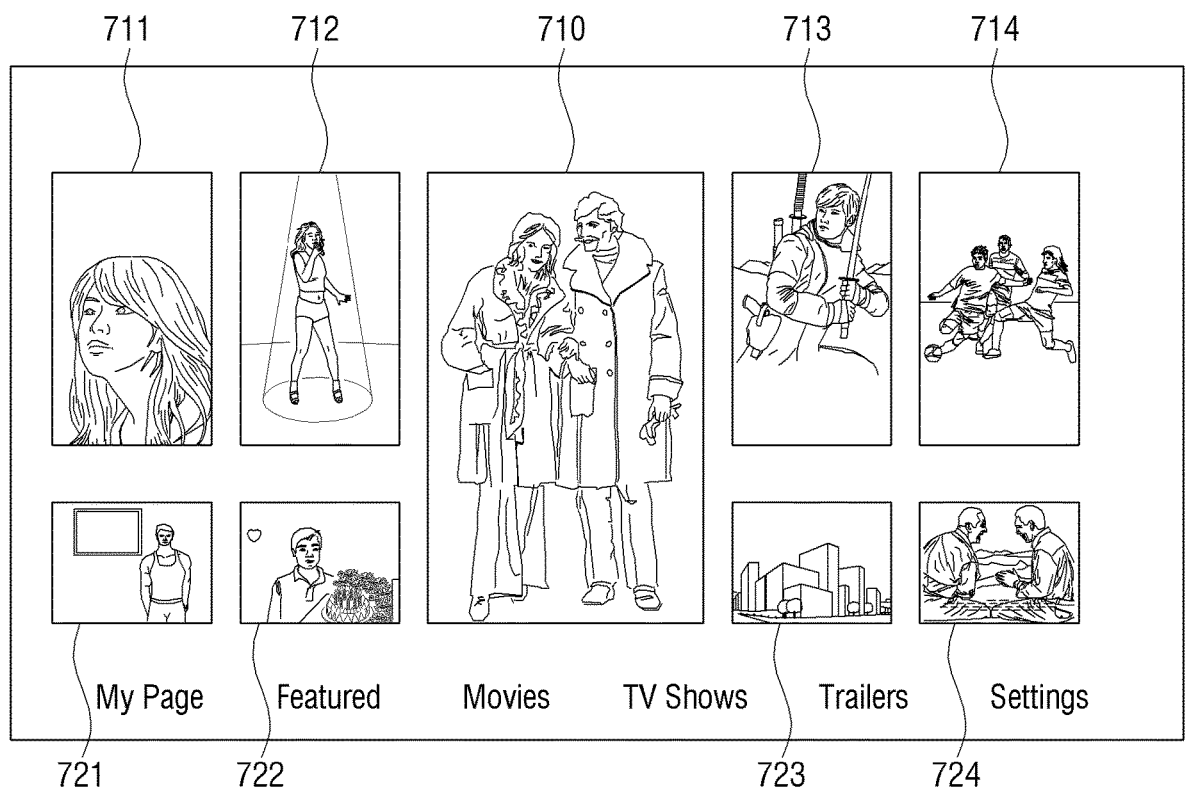

FIG. 7 is a view illustrating a content recommendation screen according to another exemplary embodiment. The content recommendation screen illustrated in FIG. 7 is generated by using a layout suitable for arranging a mixture of landscape image objects and portrait image objects. This screen is a layout for mainly displaying the portrait image objects. From among the areas, a middle area 710 has an attribute to display a relatively large image. The other areas may have an attribute to display relatively small images and may consist of areas 711 to 714 for displaying portrait images and areas 721 and 724 for displaying landscape images.

For example, when the user has viewed movies more than TV shows with the display apparatus 100, the controller 130 may generate the content recommendation screen by using a "movie preference layout" based on analysis of log information on content viewing as shown in FIG. 7. Accordingly, the proportion of the movies provided to the user through the content recommendation screen is higher than that of the TV shows.

In the examples of FIGS. 6 and 7, each of the layouts includes of a plurality of areas having different attributes according to the characteristic of the layout, and the objects for the recommendation contents are configured and displayed according to the attribute of each area. That is, in an embodiment, objects having a portrait aspect ratio are only displayed in a first area while objects having a landscape aspect ratio are only displayed in a second area of the display. In another embodiment, objects of a first type are only displayed in a first area while objects of a second type are only displayed in a second area of the display.

In addition, in the examples of FIGS. 4 to 7, the areas of each layout have different sizes and different aspect ratios according to their respective attributes. However, the attribute may include various attributes such as a color, a resolution, brightness, a language, and a kind of object in addition to the size and the aspect ratio of the recommendation content. When the color attribute is set differently, the object displayed on each area may be displayed in a different color according to the color set for each area. In addition, when the language attribute is set differently, the object displayed on each area may be displayed in a different language. For example, when Korean is set for the first area and English is set for the second area, the first area displays a movie poster made in the Korean language for the Korean market and the second area displays a movie poster made in the English language for the English or American market. The content recommendation screens illustrated in FIGS. 4 to 7 are merely examples and the content recommendation screen may be generated by using layouts of other various designs.

Figure 8:
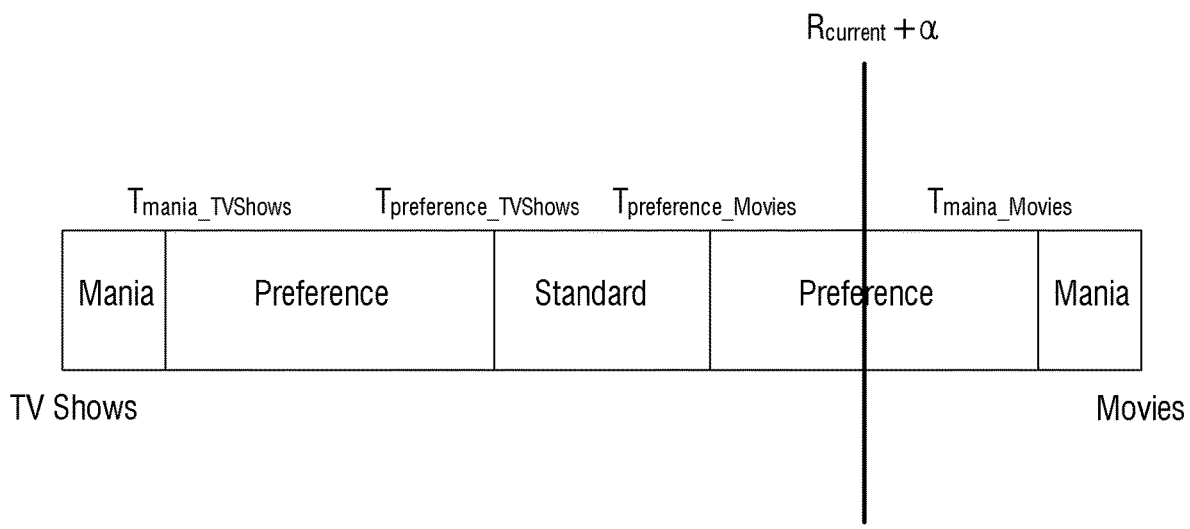
FIG. 8 is a view illustrating a method for determining a layout of a content screen according to an exemplary embodiment.

FIG. 8 is a view illustrating a method for determining a layout of a content recommendation screen based on analysis of a user's viewing pattern.

As described above with reference to FIGS. 4 to 7, the content recommendation screen may be generated using various layouts, and the layout may be determined based on viewing log information on the contents that the user has viewed. According to an exemplary embodiment, the storage 120 may store information on a movie mania layout, a TV show mania layout, a TV preference layout, and a movie preference layout. The controller 130 selects layout information corresponding to an object of a recommendation content from among the plurality of pieces of layout information, and generates a content recommendation screen based on the selected layout information.

The controller 130 may calculate the number of times the user has selected an object of content to view the content or the number of times the content has been actually executed, using the accumulated log information on the content viewing. A user's viewing pattern may be quantified like '$R_{current}$=number of times movies have been viewed ($R_{movie}$)/total number of times m contents have been viewed ($R_{total}$). When $R_{current}$ is greater than or equal to $T_{mania\_movies}$, the controller 130 generates the content recommendation screen by using the movie mania layout. The $T_{mania\_movies}$ is a threshold value for selecting the movie mania layout and may be set by the user or a manufacturer of the display apparatus 100. When $R_{current}$ is greater than or equal to $T_{preference\_movies}$ and less than $T_{mania\_movies}$, the controller 130 generates the content recommendation screen by using the movie preference layout instead of the movie mania layout.

According to an exemplary embodiment, an external factor (α) may be added to $R_{current}$. The external factor (α) is a numerical value that is independent from the user's content viewing pattern and may be arbitrarily added by a content provider. For example, the content recommendation screen may provide not only the recommendation contents reflecting user's content viewing preference but also contents for advertisement. By adding α to $R_{current}$, a layout in which an area for the content of the advertisement is further provided may be selected. Specifically, the communicator 140 may receive information on an essential recommendation content according to an advertisement contract. In this case, the information on the essential recommendation content may include information on α. In addition, the controller 130 selects layout information corresponding to $R_{current}$+ (α) and generates a content recommendation screen by using the selected layout, so that object corresponding to the essential recommendation content can be displayed on the content recommendation screen. The controller 130 may control the display to display the object corresponding to the essential recommendation content on the content recommendation screen even when the external factor (α) is not added. According to the exemplary embodiment as described above, the content recommendation screen can be generated by using the layout reflecting not only the user's viewing pattern but also the external factor. In addition, the user's various patterns for the content viewing may be quantified and classified using various threshold values such as $T_{mania\_movies}$, $T_{preference\_movies}$, $T_{preference\_TVshows}$, and $T_{mania\_TVshows}$, and various layouts suitable for the user's patterns can be provided.

Figure 9:
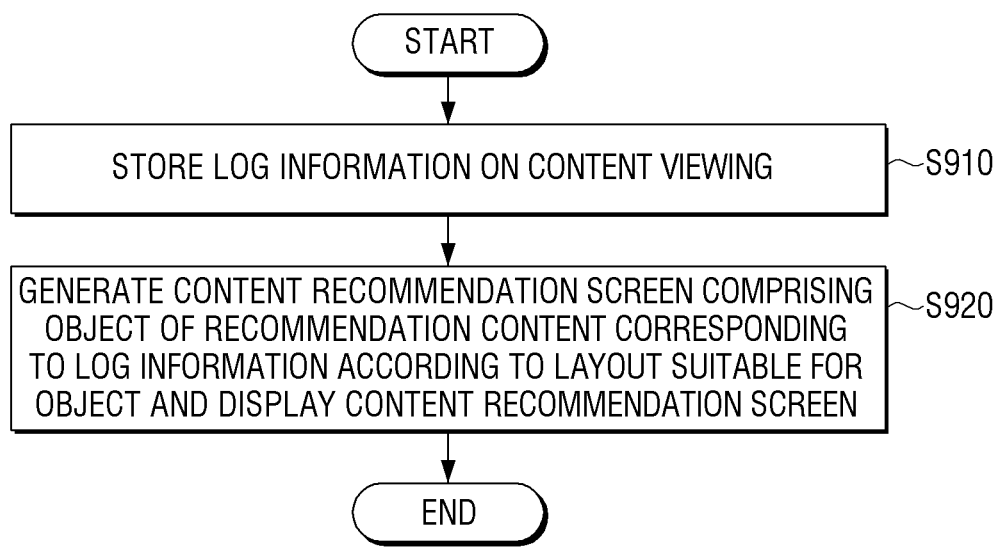
FIG. 9 is a flowchart illustrating a method for recommending contents of a display apparatus according to an exemplary embodiment.

FIG. 9 is a flowchart illustrating a method for recommending contents of a display apparatus according to an exemplary embodiment.

Referring to FIG. 9, log information on content viewing is stored (S910). The log information may be stored in a display apparatus 100 or may be stored in a server apparatus 200 connected with the display apparatus 100 through a communicator 140. The log information on the content viewing may include metadata on contents that the user has viewed, and the metadata may include information related to a genre, a manufacturer, characters, a broadcast channel, a broadcasting time zone, a broadcasting time of a content, etc. By analyzing such log information, user's content preference can be grasped, and a specific content can be recommended to the user. According to another exemplary embodiment, the recommendation content may be directly provided through a content provider.

Next, a content recommendation screen including an object of the recommendation content corresponding to the stored log information is generated by using a layout suitable for the object and displayed (S920). The object refers to an icon, a photo, a content, an image, a text, a widget area, etc. which is displayable on the screen, and the objects displayed on the screen are different in view of the attributes such as a size, an aspect ratio, and a color. According various exemplary embodiments, the content recommendation screen may be generated by using a layout suitable for the object rather than using a fixed layout. Therefore, the layout of the screen is suitable for displaying the objects of various attributes and thus the object image can be prevented from being segmented or expanded. In an embodiment, the term "segmented" may mean displayed discontinuously or displayed in sections rather than as a whole.

Figure 10:
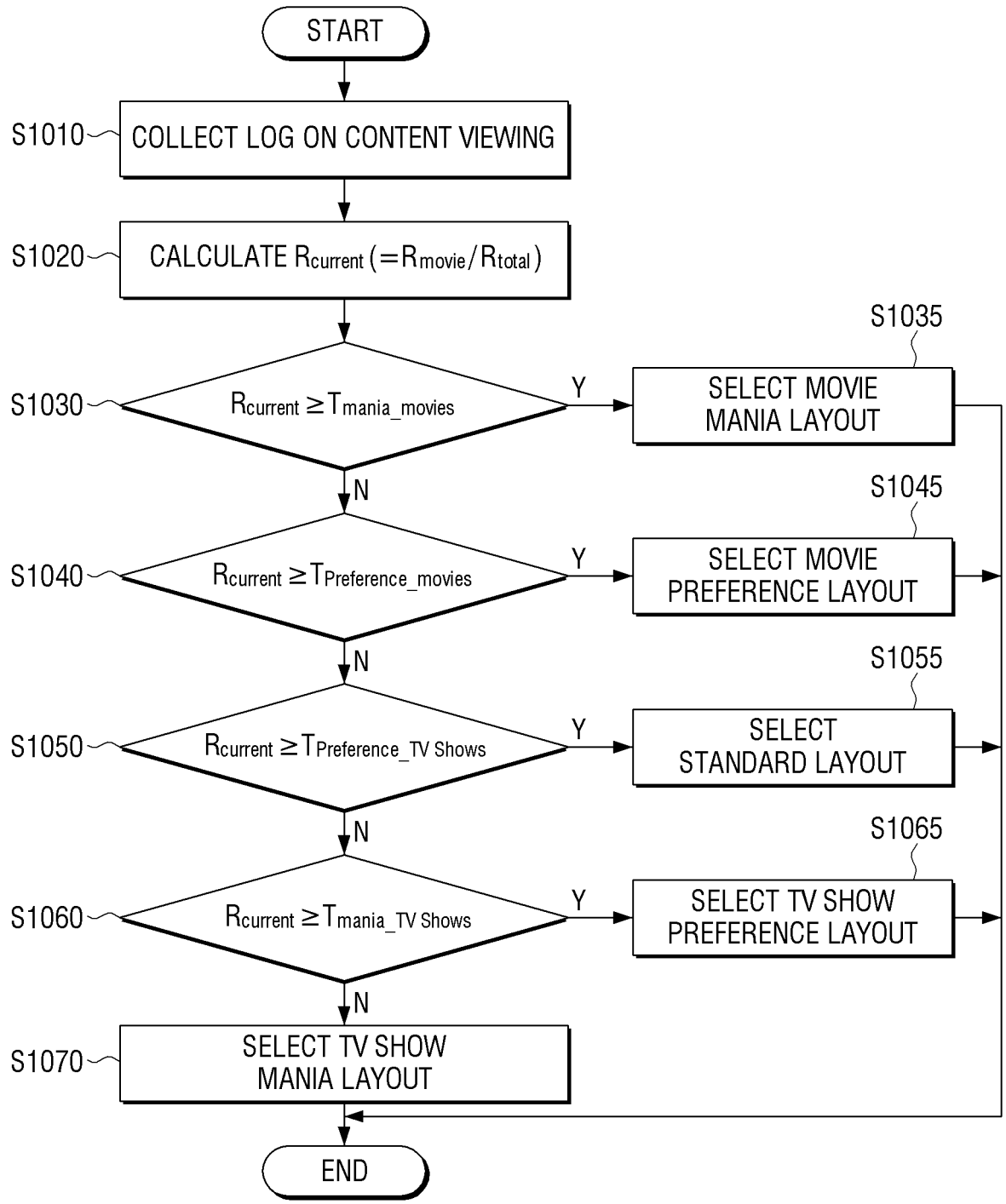
FIG. 10 is a flowchart illustrating a method for selecting a layout of a content recommendation screen according to an exemplary embodiment.

FIG. 10 is a flowchart illustrating a method for selecting a layout for a content recommendation screen according to an exemplary embodiment.

First, a log on content viewing is collected from log information stored in the storage 120 (S1010). Specifically, the number of times that the user has viewed contents and the number of times that the user has viewed a specific type of content, for example, the number of times that the user has viewed a first type of content and the number of times that the user has viewed a second type of content, are collected. The first type of content may be regarded as a movie and the second type of content may be regarded as a TV show for convenience of explanation.

Next, $R_{current}$ is calculated by calculating 'the number of times movies have been viewed ($R_{movie}$)/the total number of times all types of content have been viewed ($R_{total}$)' (S1020). That is, $R_{current}$ is a value that reflects a ratio between the number of times the user has viewed movies which is the first type of content, and the number of times the user has viewed TV shows which is the second type of content, and $R_{total}$ equals to $R_{movie}+R_{TVshow}$.

When $R_{current}$ is greater than or equal to 'a movie mania threshold value ($T_{mania\_movies}$)', a movie mania layout is selected (S1035). When the movie mania layout is selected, a content recommendation screen consisting of an area only configured for display of the movie poster image object is generated.

When $R_{current}$ is less than the movie mania threshold value ($T_{mania\_movies}$) and is greater than or equal to a 'movie preference threshold value ($T_{preference\_movies}$)', a movie preference layout is selected (S1045). Alternatively, when $R_{current}$ is less than the 'movie preference threshold value ($T_{preference\_movies}$) and is greater than or equal to 'a TV show preference threshold value ($T_{preference\_TVshows}$)', a standard layout is selected (S1055). The content recommendation screen of the movie preference layout has more areas or an area of a greater size to display objects corresponding to the movie poster images than the content recommendation screen of the standard layout. The content recommendation screen of the standard layout includes a first area for displaying objects such as the movie poster images and a second area for displaying objects such as the TV show images in the same proportions, that is with an equal number of areas or with the first and second area being of equal size.

When $R_{current}$ is less than the 'TV show preference threshold value ($T_{preference\_TVshows}$)' and is greater than or equal to a 'TV show mania threshold value ($T_{mania\_TVshows}$)', a TV show preference layout is selected (S1065). The content recommendation screen of the TV show preference layout has more areas or a larger area for displaying objects corresponding to the TV show images than the content recommendation screen of the standard layout.

When $R_{current}$ is less than a 'TV show mania threshold value $(T_{mania\_TVshows})$', a TV show mania layout is selected (S1070). When the TV show mania layout is selected, a content recommendation screen consisting of an area only for the TV show representative image object is generated. For example, in an embodiment, the recommendation screen may be configured only to display objects in landscape format to accommodate the format of the TV show representative image objects.

As described in the above exemplary embodiments, when a specific layout is selected, the content recommendation screen may be generated by using the selected layout.

According to another exemplary embodiment, the user may change the layout of the content recommendation screen when necessary.

That is, when a layout changing command is input, the controller 130 changes the layout of the content recommendation screen and controls the display 110 to rearrange the objects of the recommendation contents on the content recommendation screen according to the changed layout and display the content recommendation screen. For example, every time that the layout changing command is input, the controller 130 may reconfigure the content recommendation screen by applying the plurality of pieces of layout information stored in the storage 120 in sequence. Specifically, every time that the layout changing command is input, the layout of the content recommendation screen may be changed by selecting the next layout of the currently applied layout in sequence from among the plurality of pieces layout information shown in FIGS. 4 to 7. For another example, when the layout changing command is input, the controller 130 displays a highlight on an area to change an attribute from among the areas in the content recommendation screen, and displays a pop-up window indicating the attribute to change on one side of the corresponding area. The pop-up window may display a size, an aspect ratio, a color, a resolution, brightness, a language, and a kind of object. For example, when the 'size' is selected through the pop-up window, a sub pop-up window displaying a kind of size is displayed. When a minimum size is selected, the size of the area to change the attribute is changed to correspond to the minimum size. For another example, when the aspect ratio is selected through the pop-up window, a sub pop-up window displaying 'portrait' and 'landscape' is displayed. When 'landscape' is selected, the existing portrait area is changed to a landscape area.

According to the various exemplary embodiments as described above, the user can change the existing layout to a layout according to a user's taste.

According to another exemplary embodiment, when a new recommendation command is input, the controller 130 controls the display 110 to rearrange new objects different from the existing objects displayed on the content recommendation screen on the content recommendation screen according to the layout, and display the content recommendation screen. For example, the new recommendation command may be input by pressing a refresh button through the UI screen. When the new recommendation command is input, new recommendation contents are displayed through the content recommendation screen and thus the user may have an option of selecting more recommendation contents.

Figure 11:
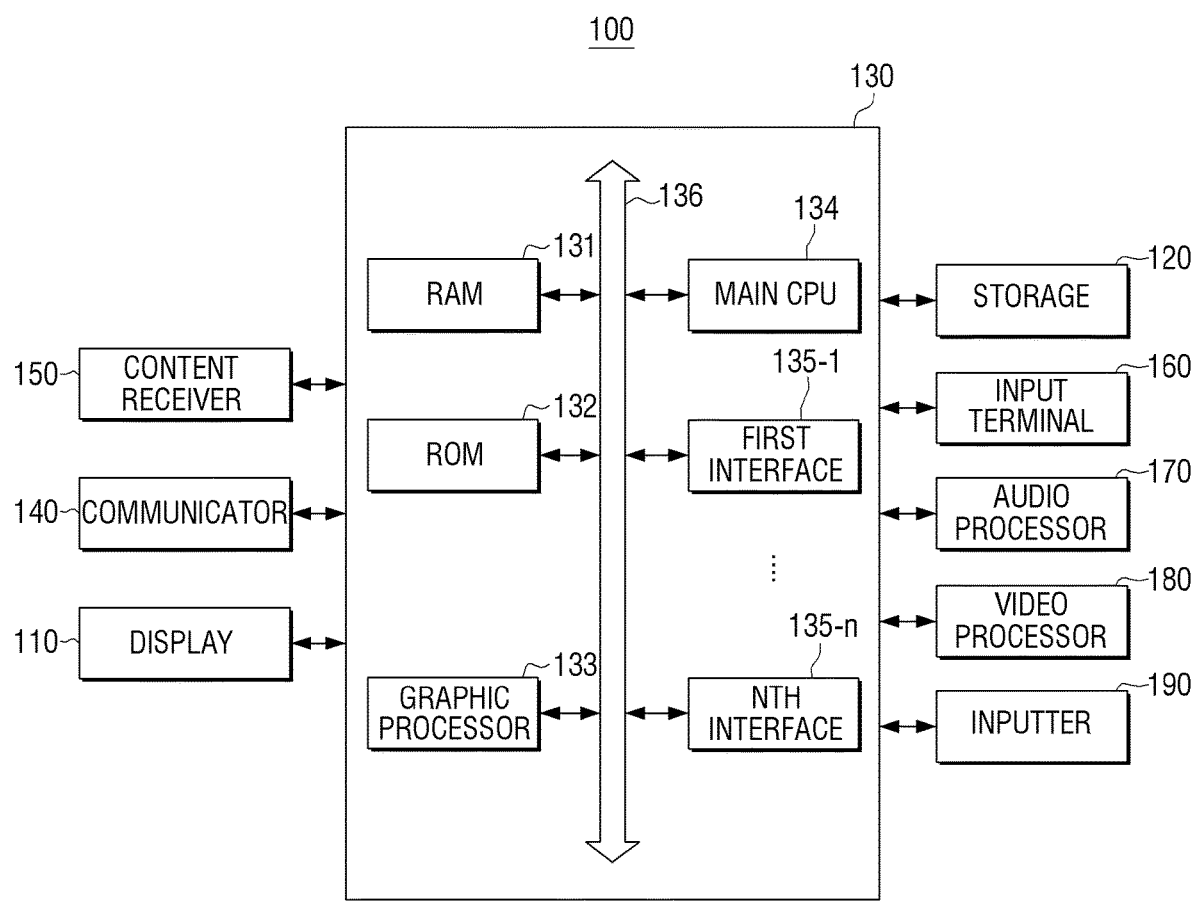
FIG. 11 is a block diagram illustrating a display apparatus according to another exemplary embodiment.

FIG. 11 is a block diagram illustrating an example of a detailed configuration of a display apparatus when the display apparatus is implemented as a TV which receives and outputs a broadcast program. As shown in FIG. 11, the display apparatus 100 may include, for example, an image receiver 150, a communicator 140, a display 110, a controller 130, a storage 120, an input terminal 160, an audio processor 170, a video processor 180, and an inputter 190.

FIG. 11 illustrates the display apparatus 100 as an apparatus equipped with various functions such as a communication function, an image receiving function, and a display function, and illustrates overall elements of the display apparatus 100. Accordingly, some of the elements illustrated in FIG. 11 may be omitted or changed and another element may be added according to an exemplary embodiment.

The image receiver 150 receives image data from various sources. For example, the image receiver 150 may receive broadcasting data from an external broadcasting station, may receive image data from an external apparatus (for example, a Digital Versatile Disk (DVD), a Blu-ray Disk player, etc.), and may receive image data stored in the storage 120.

The communicator 140 is configured to communicate with various kinds of external apparatuses or external servers according to various kinds of communication methods. The communicator 140 may include various communication chips such as a Wi-Fi chip, a Bluetooth chip, a Near Field Communication (NFC) chip, a wireless communication chip, etc. In this case, the Wi-Fi chip, the Bluetooth chip, and the NFC chip perform communication in a Wi-Fi method, a Bluetooth method, and an NFC method, respectively. Among these, the NFC chip is operated in the NFC method, which uses a band of 13.56 MHz from among various RF-ID frequency bands such as 135 kHz, 13.56 MHz, 433 MHz, 860~960 MHz, and 2.45 GHz. When the Wi-Fi chip or the Bluetooth chip is used, a variety of connection information such as an SSID and a session key is exchanged first and connection is established using the connection information, and then, a variety of information is exchanged. The wireless communication chip refers to a chip that performs communication according to various communication standards such as IEEE, Zigbee, $3^{rd}$ generation (3G), $3^{rd}$ Generation Partnership Project (3GPP), and Long Term Evolution (LTE).

The communicator 140 may receive information on an essential recommendation content. The essential recommendation content refers to a content that should be essentially or mandatorily displayed on the content recommendation screen, and may be determined by a contract between the content provider and the user. When the essential recommendation content is received, the controller 130 may control the display 110 to display an object corresponding to the essential recommendation content on the content recommendation screen.

The display 110 displays at least one of a video frame which is a result of processing image data received from the image receiver 150 by the video processor 180, and various screens which are generated by a graphic processor 133. The display 110 displays image data under the control of the controller 130.

The storage 120 stores various modules for driving the display apparatus 100. For example, the storage 120 may store software including a base module, a sensing module, a communication module, a presentation module, a web browser module, and a service module. In this case, the base module refers to a module which processes signals transmitted from each hardware included in the display apparatus 100 and transmits the signals to an upper layer module. The sensing module is a module which collects information from various sensors, and analyzes and manages the collected information. The sensing module may include a face recognition module, a voice recognition module, a motion recognition module, and an NFC recognition module. The presentation module is a module which generates a display screen, and includes a multimedia module to reproduce multimedia contents and output the multimedia contents, and a user interface (UI) rendering module to process a UI and graphics. The communication module is a module for communicating with an external apparatus. The web browser module is a module for performing web browsing and accessing a web server. The service module is a module including various applications for providing various services. In particular, the storage 120 may store a log information analysis module for analyzing log information on content viewing. A result calculated by the analysis of the log information may be used to select layout information from among the plurality of pieces of layout information stored in the storage 120. The method for selecting the layout information has been described with reference to FIG. 10.

Each control module described above may be implemented by software stored in the storage 120, and may be implemented through separate pieces of hardware.

The storage 120 may store the plurality of pieces of layout information. The layout information may be updated and stored. According to another exemplary embodiment, the user may edit the layout of the content recommendation screen based on pre-stored layout information. New layout information corresponding to the edited layout may be stored in the storage 120. In addition, layout information corresponding to a layout newly designed by the user may be stored in the storage 120.

The input terminal 160 may include a plurality of terminals, for example, HDMI, DVI, digital broadcast reception, and USB terminals.

The audio processor 170 is an element for processing audio data. The audio processor 170 may perform various processing operations such as decoding, amplification, noise filtering, etc. with respect to the audio data.

The video processor 180 is an element for processing image data received at the image receiver 150. The video processor 180 may perform various image processing operations such as decoding, scaling, noise filtering, frame rate conversion, resolution conversion, etc. with respect to the image data. The inputter 190 is an element for receiving a user command to control an overall operation of the display apparatus 100. For example, the inputter 190 may be implemented by using various input devices such as a remote controller, a pointing device, a motion sensor for sensing a user's motion, a voice sensor for sensing a user's voice, a mouse, etc.

The controller 130 controls the overall operation of the display apparatus 100 using various programs stored in the storage 120.

As shown in FIG. 11, the controller 130 includes a Random Access Memory (RAM) 131, a Read Only Memory (ROM) 132, a graphic processor 133, a main CPU 134, first to nth interfaces 135-1~135-$n$, and a bus 136. The RAM 131, the ROM 132, the graphic processor 133, the main CPU 134, and the first to the nth interfaces 135-1~135-$n$ may be connected to one another through the bus 136.

The ROM 132 stores a set of commands to boot the system. When a turn on command is input and power is supplied, the main CPU 134 copies an operating system (O/S) stored in the storage 120 into the RAM 131 according to a command stored in the ROM 132, executes the O/S and boots the system. When the booting is completed, the main CPU 134 copies the various application programs stored in the storage 120 into the RAM 131, executes the application programs copied into the RAM 131, and performs various operations.

The first and nth interfaces 135-1 to 135-$n$ are connected with the above-described various elements. One of the interfaces may be a network interface connected with an external apparatus through a network.

The graphic processor 133 generates a screen including various objects such as an icon, an image, and a text using a calculator (not shown) and a renderer (not shown). The calculator calculates attribute values of each object to be displayed, such as coordinates values, a shape, a size, and a color, according to a layout of the screen using the control command received from the inputter 190. The renderer generates a screen of various layouts including objects based on the attribute values calculated by the calculator. The screen generated by the renderer is displayed on a display area of the display 110.

In particular, when a layout of a content recommendation screen is determined, the graphic processor 133 may generate a content recommendation screen by arranging objects of recommendation contents according to the determined layout.

The method for recommending the contents of the display apparatus according to the above-described various exemplary embodiments may be coded as software and may be stored in a non-transitory readable medium. The non-transitory readable medium may be mounted and used in various devices.

The non-transitory readable medium refers to a medium that stores data semi-permanently rather than storing data for a very short time, such as a register, a cache, and a memory, and is readable by an apparatus. Specifically, the non-transitory readable medium may be a compact disc (CD), a digital versatile disk (DVD), a Blu-ray disk, a USB, a memory card, a ROM, hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer or processor using an interpreter.

The described hardware devices may also be configured to act as one or more software modules in order to perform the operations of the above-described embodiments The method to measure a position of a beam may be executed on a general purpose computer or processor or may be executed on a particular machine such as the network connection system or USB input/output server device described herein. Any one or more of the software modules described herein may be executed by a dedicated processor unique to that unit or by a processor common to one or more of the modules.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A display apparatus, comprising:
   a display to display a content recommendation screen including a movie content and a TV program content;

a controller to:
identify a ratio value of a number of times the movie content has been viewed and a number of times the TV program content has been viewed based on log information on a user's content viewing,
obtain layout information corresponding to the identified ratio value,
generate a layout for the content recommendation screen by respectively setting a first display area for the movie content and a second display area for the TV program content in proportion to the obtained layout information, and
control the display to display the content recommendation screen, including the movie content together with the TV program content, according to the generated layout; and
a storage to store a plurality of pieces of layout information, wherein at least one of the plurality of pieces of layout information is set differently than another of the plurality of pieces of layout information, and
wherein the controller is to:
identify layout information corresponding to the identified ratio value from among the plurality of pieces of layout information stored in the storage, and
control the display to rearrange an object of a recommendation content according to the identified layout information and display the object on the content recommendation screen,
wherein, when a proportion of the viewed movie content is greater than or equal to a predetermined value, the controller selects layout information including an object display area for displaying the movie content, and
wherein, when a proportion of the viewed TV program content is greater than or equal to a predetermined value, the controller selects layout information including an object display area for displaying the TV program content.

2. The display apparatus of claim 1,
wherein the controller selects layout information corresponding to an object of a recommendation content from among the plurality of pieces of layout information, and generates the content recommendation screen based on the selected layout information.

3. The display apparatus of claim 1, wherein the content recommendation screen is divided into a plurality of areas according to the layout, and
wherein an object of a recommendation content is displayed in an area according to an attribute assigned to the area.

4. The display apparatus of claim 3, wherein the attribute assigned to the area comprises at least one of a size, an aspect ratio, a color, a resolution, brightness, a language, and a kind of object of the object of the recommendation content.

5. The display apparatus of claim 1, further comprising a communicator to receive information on an essential recommendation content, and
wherein the controller controls the display to display an object corresponding to the essential recommendation content on the content recommendation screen.

6. The display apparatus of claim 1, wherein, when a layout changing command is input, the controller changes the layout for the content recommendation screen according to the layout changing command, and controls the display to rearrange an object of a recommendation content on the content recommendation screen according to the changed layout and display the content recommendation screen.

7. The display apparatus of claim 1, wherein, when a new recommendation command is input, the controller controls the display to rearrange a new object which is different from an existing object displayed on the content recommendation screen on the content recommendation screen according to the layout, and display the content recommendation screen.

8. The display apparatus of claim 1, further comprising a communicator to communicate with a server apparatus which stores a plurality of pieces of layout information, wherein at least one of the plurality of pieces of layout information is set differently than another of the plurality of pieces of layout information, and
wherein the controller receives layout information corresponding to an object of a recommendation content from the server apparatus, and generates the content recommendation screen based on the received layout information.

9. The display apparatus of claim 8, wherein, when a layout changing command is input, the controller receives new layout information from the server apparatus according to the layout changing command, and rearranges the object of the recommendation content on the content recommendation screen according to the received layout and displays the content recommendation screen on the display.

10. The display apparatus of claim 1, further comprising a communicator to receive the content recommendation screen from a server apparatus which generates the content recommendation screen based on the log information.

11. A method for recommending contents of a display apparatus to display a content recommendation screen including a movie content and a TV program content, the method comprising:
identifying a ratio value of a number of times the movie content has been viewed and a number of times the TV program content has been viewed based on log information on a user's content viewing;
obtaining layout information corresponding to the identified ratio value,
generating a layout for the content recommendation screen by setting a first display area for the movie content and a second display area for the TV program content in proportion to the obtained layout information;
generating the content recommendation screen; and
displaying the content recommendation screen including the movie content together with the TV program content, according to the generated layout,
wherein the displaying comprises:
selecting layout information corresponding to the identified ratio value from among pre-stored plurality of pieces of layout information, and
rearranging an object of the recommendation content according to the selected layout information and displaying the object on the content recommendation screen,
wherein the selecting comprises:
when a proportion of the viewed movie content is greater than or equal to a predetermined value, selecting layout information including an object display area for displaying the movie content; and
when a proportion of the viewed TV program content is greater than or equal to a predetermined value, selecting layout information including an object display area for displaying the TV program content.

12. The method of claim 11, wherein the displaying the content recommendation screen comprises:

selecting layout information corresponding to an object of a recommendation content from among a plurality of pieces of layout information that are pre-stored, wherein at least one of the plurality of pieces of layout information is set differently than another of the plurality pieces of layout information; and generating the content recommendation screen based on the selected layout information and displaying the content recommendation screen.

13. The method of claim 11, wherein the content recommendation screen is divided into a plurality of areas according to the layout, and wherein the displaying comprises displaying an object of a recommendation content on each area according to an attribute assigned to each of the plurality of areas.

14. The method of claim 13, wherein the attribute comprises at least one of a size, an aspect ratio, a color, a resolution, brightness, a language, and a kind of object of the object of the recommendation content.

15. The method of claim 11, further comprising receiving information on an essential recommendation content, and wherein the displaying comprises displaying an object corresponding to the essential recommendation content on the content recommendation screen.

16. The method of claim 11, further comprising:

receiving a layout changing command; and changing a layout of the content recommendation screen according to the layout changing command, and rearranging an object of the recommendation content on the content recommendation screen according to the changed layout and displaying the content recommendation screen.

17. The method of claim 11, further comprising:

receiving a new recommendation command; and rearranging a new object which is different from an existing object displayed on the content recommendation screen on the content recommendation screen according to the layout, and displaying the content recommendation screen.

* * * * *

UNITED STATES PATENT AND TRADEMARK OFFICE
CERTIFICATE OF CORRECTION

PATENT NO. : 11,184,678 B2
APPLICATION NO. : 14/499787
DATED : November 23, 2021
INVENTOR(S) : Lee et al.

Page 1 of 1

It is certified that error appears in the above-identified patent and that said Letters Patent is hereby corrected as shown below:

In the Claims

Column 18, Lines 4-5:
In Claim 7, delete "on the content recommendation screen on the content recommendation screen" and insert --on the content recommendation screen--, therefor.

Column 19, Line 6:
In Claim 12, before "pieces" insert --of--.

Column 20, Lines 16-17:
In Claim 17, delete "on the content recommendation screen on the content recommendation" and insert --on the content recommendation screen--, therefor.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*